W. De C. TILNEY.
Tailors' Measure.
No. 165,383. Patented July 6, 1875.
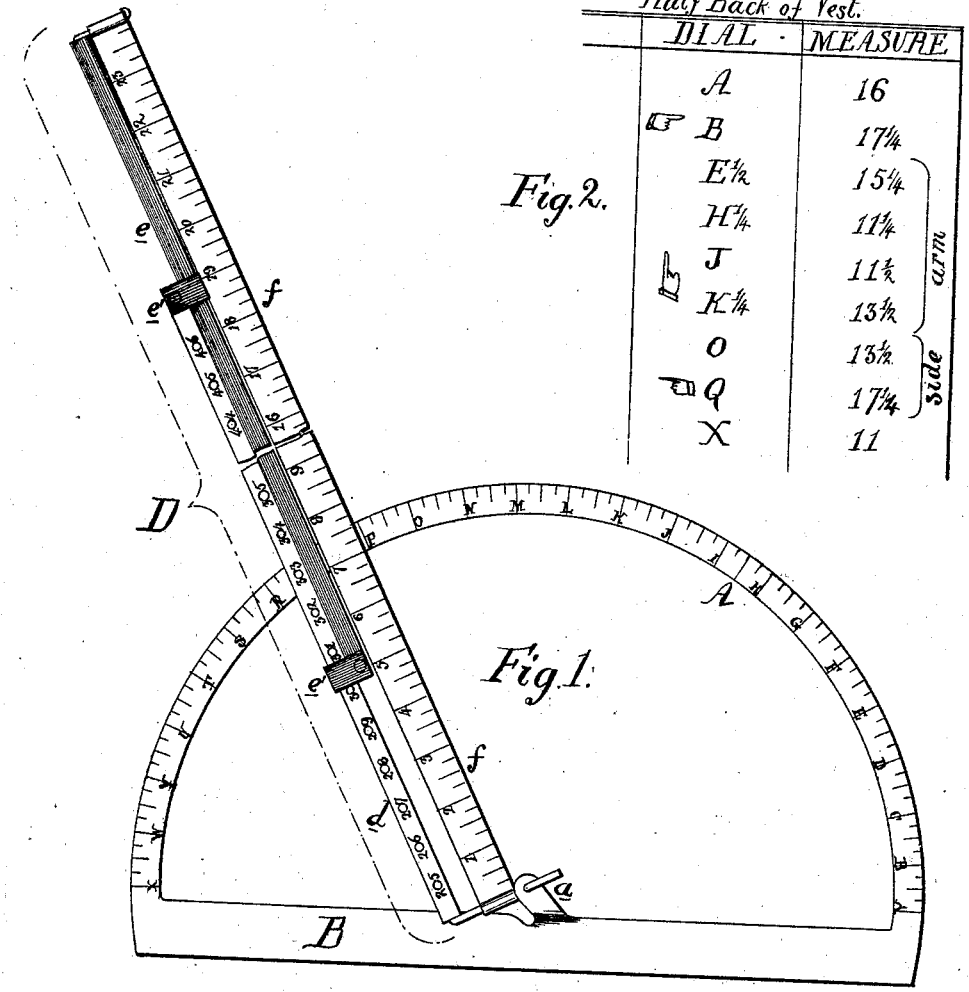
| Half Back of Vest. | |
|---|---|
| DIAL | MEASURE |
| A | 16 |
| B | 17¼ |
| E½ | 15¼ |
| H¼ | 11¼ |
| J | 11½ |
| K¼ | 13½ |
| O | 13½ |
| Q | 17¼ |
| X | 11 |
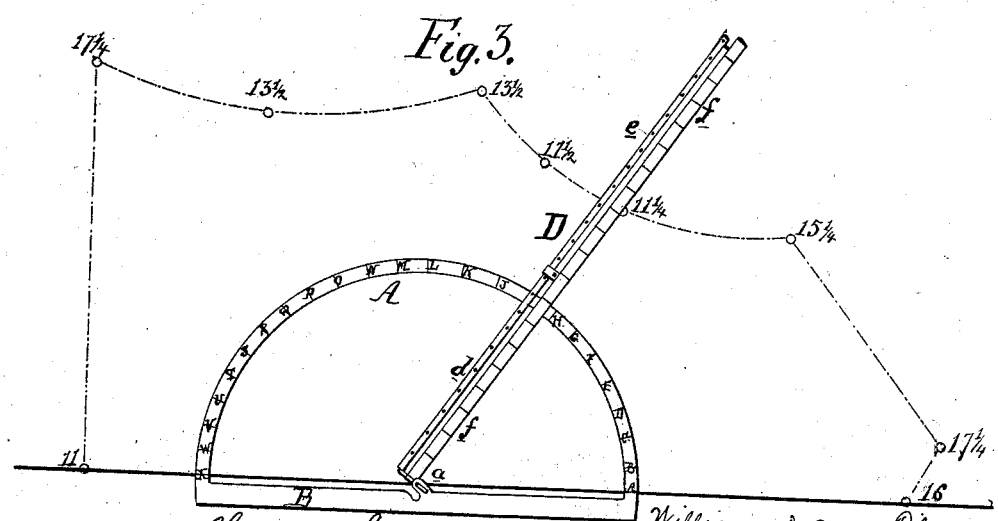
Witnesses: Harry Smith, Thomas McIlvain
William DeCaud Tilney
by his Attorneys
Horosman and Son

UNITED STATES PATENT OFFICE.

WILLIAM DE CAUX TILNEY, OF CRAWFORDSVILLE, INDIANA.

IMPROVEMENT IN TAILORS' MEASURES.

Specification forming part of Letters Patent No. 165,383, dated July 6, 1875; application filed February 23, 1875.

*To all whom it may concern:*

Be it known that I, WILLIAM DE CAUX TILNEY, of Crawfordsville, Montgomery county, Indiana, have invented certain Improvements in Cutting out Garments or Patterns for the same, of which the following is a specification:

The object of my invention is to facilitate the cutting out of articles of clothing or the marking of patterns for the same; and this object I attain by the device which I will now proceed to describe, reference being had to the accompanying drawing, in which—

Figure 1 is a front view of the instrument; and Figs. 2 and 3, diagrams, illustrating the application of the same.

The instrument consists of a graduated segmental plate, A, having a cross-piece, B, to a projection, a, on which is pivoted one end of the elastic measure D, the latter consisting of two strips, d and e, arranged to slide on each other, and guided by sleeves e', the strip d being graduated, as shown, and being perforated at each graduation, so that after the adjustment of one slide upon the other a pin may be inserted at the proper point, and the parts retained in the position to which they have been adjusted. A graduated scale, f, of elastic material is combined with the sliding strips, in the manner shown in Fig. 1, one end of the elastic scale being connected to the end of the strip d, while the opposite end is attached to the end of the strip e, the tendency of the elastic scale f being to cause the strip e to slide on the strip d in the direction of the arrow. The graduations of the strip d refer to the corresponding numbers in inches on a common inch tape measure, which is used in obtaining the measurement around the bust or hips, according to the nature of the garment desired. A number of tables (one for every piece of each article of dress) are used in connection with the above-described instrument, one of these tables being shown in Fig. 2. Each table contains two columns, one for reference to points on the dial A, and the other containing a series of measurements, the numbers of the measure-column opposite each letter in the dial-column representing the points on the elastic scale f, at which marks are to be made on the goods in the direction pointed out by the said dial-points. But one table is used for each piece, whatever may be the size, the variations being obtained by the adjustment of the arms d and e of the elastic measure D. This adjustment, as before described, is dependent upon the measure in inches of the bust or hips. Thus, if the bust measures forty inches, the same table would be used in marking out the pattern as though the bust measures but thirty inches, the difference in the result obtained being effected by the difference in the expansion of the elastic scale f.

It will be readily understood that in cases where the bust or hip measure does not exceed twenty-four inches the measure is not extended.

In marking out the pattern for a vest, for instance, supposing the bust measure to be thirty-four inches, the mode of operation will be as follows: The slide e is first adjusted on the graduated strip d until its sleeve passes the number thirty-four. A pin is then inserted in the hole at this point to keep the instrument in place. The tables for the different portions of the garment are now consulted. I have illustrated in Fig. 2 of the drawing the table for half of the back of a vest, and will proceed to describe its application, reference being also had to Fig. 3. The measure D, adjusted as above described, is attached to the dial in the manner shown, and the dial and measure are then laid on the edge of the goods to be cut—that is, the marks at A and X on the dial are laid on the edge, or on a base-line if the goods are not straight. The elastic scale f is then adjusted to each of the letters on the dial, as given in the dial-column of the table, a mark being made on the goods opposite the number on the elastic scale, as directed in the number-column of the table opposite the said letter. The dial and measure being removed, the various marks are connected, the curved lines in the measure-column of the table indicating which of the marks are to be connected by curved lines, the intermediate marks on the cloth giving the depth of the curves. Hands are also placed to those letters in the dial-column which represent the greatest distance on the goods in the direction in which the hands point, to enable the operator to so adjust the dial as to prevent waste of material.

It will be evident that by employing but one table for all sizes, in connection with the elastic measure D, and relying solely upon the different degrees of expansion of the elastic scale $f$ for different results, no calculation whatever is required, and the operation of cutting out garments is consequently much simplified.

I claim as my invention—

1. An instrument for marking out clothing or patterns for the same, consisting of the graduated dial A, and the expanding-measure D, constructed and operating all substantially as and for the purpose herein set forth.

2. The within-described expanding-measure, in which are combined the sliding strip $e$, graduated and perforated strip $d$, and elastic scale $f$, all substantially as set forth.

In testimony whereof I have signed my name to this specification in the presence of two subscribing witnesses.

WILLIAM DE CAUX TILNEY.

Witnesses:
  LABAN LINDLEY,
  JOHN A. MICKEY.